(12) United States Patent
Ray (10) Patent No.: US 9,055,499 B1
(45) Date of Patent: Jun. 9, 2015

(54) COMMUNICATION CONTROL SYSTEM TO CONTROL COMMUNICATION SESSIONS OVER A LONG TERM EVOLUTION (LTE) NETWORK

(71) Applicant: Sprint Communications Company L.P., Overland Park, KS (US)

(72) Inventor: Amar Nath Ray, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/189,759

(22) Filed: Feb. 25, 2014

(51) Int. Cl.
*H04W 36/14* (2009.01)
*H04W 36/16* (2009.01)
*H04W 36/00* (2009.01)

(52) U.S. Cl.
CPC ........ *H04W 36/165* (2013.01); *H04W 36/0066* (2013.01); *H04W 36/14* (2013.01)

(58) Field of Classification Search
CPC .............................. H04W 36/00; H04W 36/14
USPC ................... 370/331, 216; 455/437, 439, 566
See application file for complete search history.

(56) References Cited

U.S. PATENT DOCUMENTS

| | | | | |
|---|---|---|---|---|
| 8,199,719 | B2* | 6/2012 | Taneja | 370/331 |
| 8,396,445 | B2* | 3/2013 | Crawford et al. | 455/404.1 |
| 8,428,601 | B2* | 4/2013 | Samar et al. | 455/439 |
| 8,503,975 | B2* | 8/2013 | Sennett et al. | 455/404.2 |
| 8,644,218 | B1 | 2/2014 | Pankajakshan et al. | |
| 8,731,564 | B2* | 5/2014 | Suzuki | 455/437 |
| 2010/0041418 | A1 | 2/2010 | Edge et al. | |
| 2010/0233991 | A1 | 9/2010 | Crawford et al. | |
| 2012/0188980 | A1* | 7/2012 | Wang et al. | 370/331 |
| 2012/0329527 | A1* | 12/2012 | Kang et al. | 455/566 |
| 2013/0189981 | A1* | 7/2013 | Suzuki | 455/435.2 |
| 2013/0190003 | A1* | 7/2013 | Smith et al. | 455/452.1 |
| 2013/0310045 | A1* | 11/2013 | Yan et al. | 455/437 |
| 2014/0092721 | A1* | 4/2014 | Pankajakshan et al. | 370/216 |

* cited by examiner

*Primary Examiner* — Chi H Pham
*Assistant Examiner* — Shailendra Kumar (57) ABSTRACT

A communication control system controls communication over a Long-Term Evolution (LTE) network and a non-LTE network. The communication control system receives a communication session request transferred from a wireless communication device over the non-LTE network. In response, the communication control system initiates a voice communication session between the wireless communication device and a first communication interface. The communication control system requests an LTE registration notification for the wireless communication device. After the wireless communication device registers with the LTE network, the communication control system receives the LTE registration notification. In response, the communication control system initiates a media communication session over the LTE network between the wireless communication device and a second communication interface.

18 Claims, 6 Drawing Sheets

COMMUNICATION CONTROL SYSTEM TO CONTROL COMMUNICATION SESSIONS OVER A LONG TERM EVOLUTION (LTE) NETWORK

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), Wireless Fidelity (WIFI), and the like. Wireless communication devices may be able to use multiple wireless protocols.

A dual mode communication device may communicate over a non-LTE network and an LTE network. In some areas, an LTE network may be unavailable. In other areas, although an LTE network is available, it may be heavily loaded or the wireless communication device may receive a stronger signal from the non-LTE network. The LTE-capable communication device may register with and communicate over the non-LTE communication network, until the LTE communication network becomes available. In some cases, although the wireless communication device may initially register with the LTE communication network, the wireless device may be handed-off (either soft or hard) to a non-LTE communication network.

OVERVIEW

A communication control system controls communication over a Long-Term Evolution (LTE) network and a non-LTE network. The communication control system receives a communication session request transferred from a wireless communication device over the non-LTE network. In response, the communication control system initiates a voice communication session between the wireless communication device and a first communication interface. The communication control system requests an LTE registration notification for the wireless communication device. After the wireless communication device registers with the LTE network, the communication control system receives the LTE registration notification. In response, the communication control system initiates a media communication session over the LTE network between the wireless communication device and a second communication interface.

DETAILED DESCRIPTION

Figure 1:
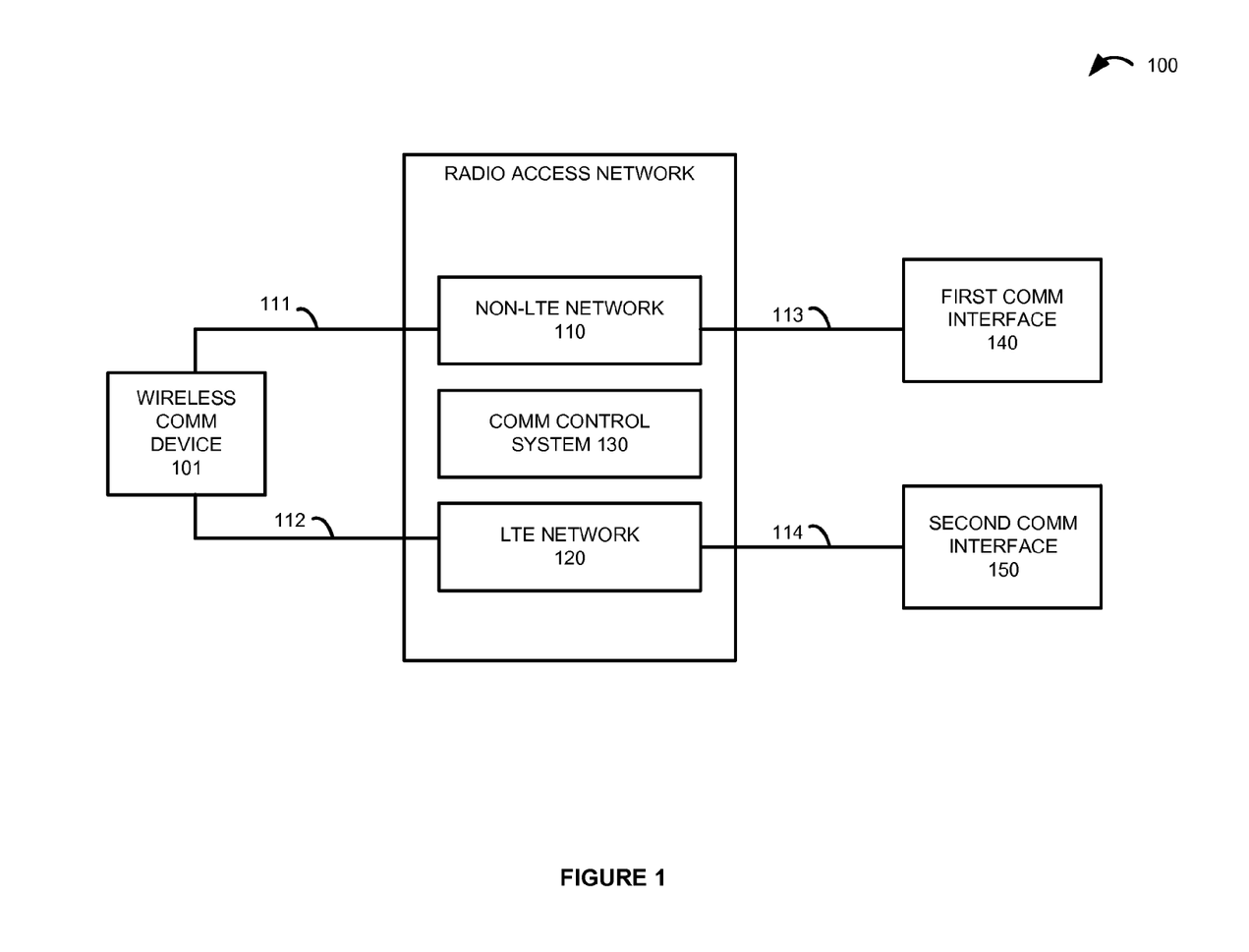
FIG. 1 illustrates a communication system to control communications over an LTE network and a non-LTE network.

FIG. 1 illustrates communication system 100 to control communications over LTE network 120 and non-LTE network 110. Communication system 100 includes wireless communication device 101, non-LTE network 110, LTE network 120, communication control system 130, first communication interface 140, second communication interface 150, and communication links 111-114.

Wireless communication device 101 and non-LTE network 110 communicate over wireless link 111. Wireless communication device 101 and LTE network 120 communicate over wireless link 112. Non-LTE network 110 and first communication interface 140 communicate over communication link 113. LTE network 120 and second communication interface 150 communicate over communication link 114. First communication interface 140 and second communication interface 150 may be located in the same location or may be located in separate locations. Although not shown, non-LTE network 110 may also communicate with second communication interface 150 and LTE network 120 may also communicate with first communication interface 140.

Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Examples of first communication interface 140 and second communication interface 150 include another wireless communication device or a Public Safety Answering Point (PSAP). Examples of non-LTE network 110 include EVDO, CDMA, GSM, HSPA, WIFI or some other non-LTE wireless protocol.

In operation, wireless communication device 101 transfers a communication session request over non-LTE network 110 to first communication interface 140. In response, a voice communication session is initiated between wireless communication device 101 and first communication interface 140. Examples of a voice communication session include a wireless voice call or a wireless emergency voice call. Communication control system 130 requests an LTE registration notification when wireless communication device 101 registers with LTE network 120. Wireless communication device 101 registers with LTE network 120 and communication control system 130 receives the LTE registration notification. In response, a media communication session over LTE network 120 is initiated between wireless communication device 101 and second communication interface 150. Examples of a media communication session include a Voice over Internet Protocol (VoIP) call or a video call.

Figure 2:
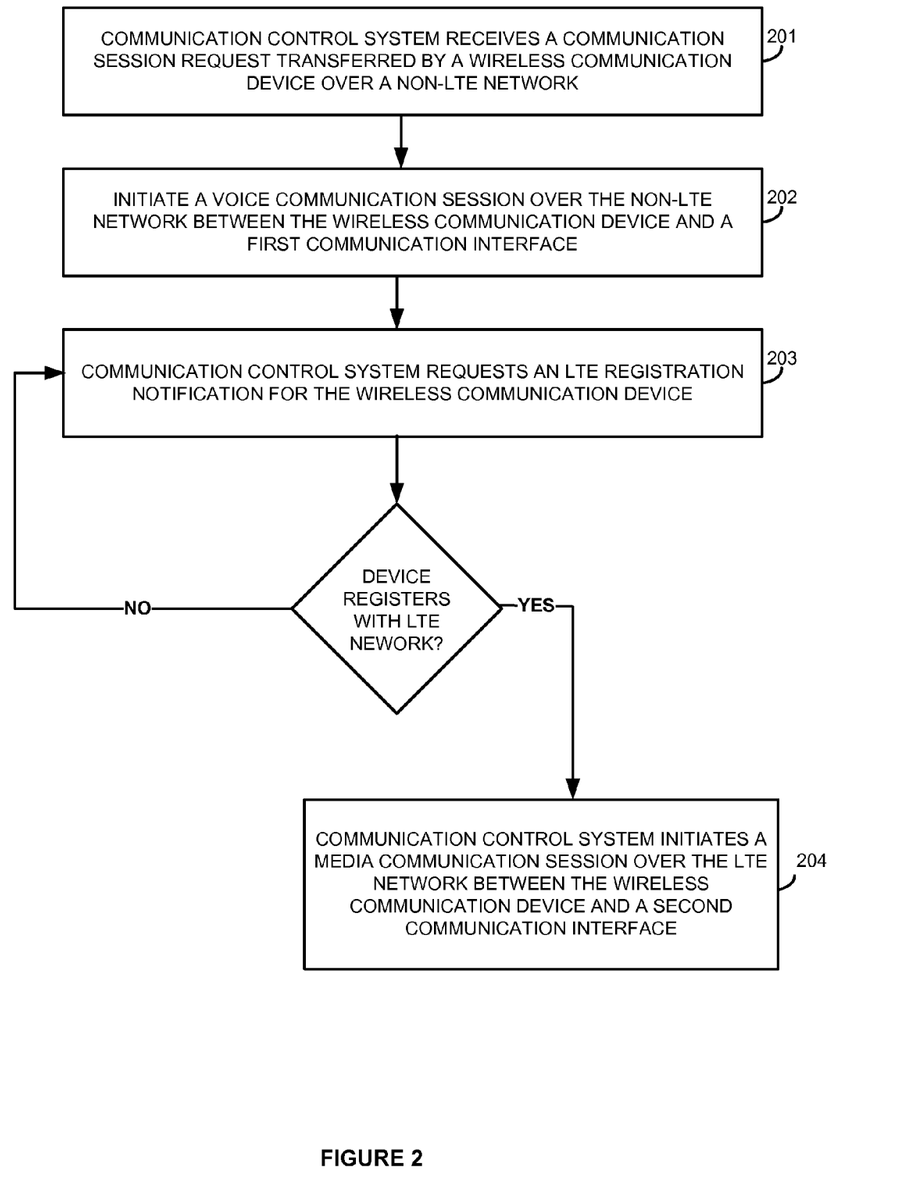
FIG. 2 illustrates the operation of the communication system to control communications over the LTE network and the non-LTE network.

FIG. 2 illustrates the operation of communication system 100 to control communications over LTE network 120 and non-LTE network 110. Wireless communication device 101 may be a dual mode device capable of communicating over multiple wireless protocols. Communication control system 130 receives a communication session request transferred by wireless communication device 101 over non-LTE network 110 (201). For example, wireless communication device 101 may transfer the communication session request via a base station or WIFI hotspot that is part of non-LTE network 110.

In response, a voice communication session is initiated over non-LTE network 110 between wireless communication device 101 and first communication interface 140 (202). Communication control system 130 requests an LTE registration notification for wireless communication device 101 in response to the communication session (203). For example, communication control system 130 may request LTE registration notification in response to an emergency session, a high QoS session, or some other specific type of session. In addition, communication control system 130 may request the LTE registration notification in response to the identity of wireless communication device 101 and/or the identity of first communication interface 140.

When wireless communication device 101 registers with LTE network 120, communication control system 130 receives the LTE registration notification. The LTE registration notification may be transferred from a Home Location Register (HLR) or Home Subscriber Server (HSS). The HLR or HSS may identify wireless communication device 101 by a Mobile Device Number (MDN), Mobile Identification Number (MIN), Uniform Resource Identifier (URI), IP address, or some other identifier—including combinations thereof. In response, a media communication session is initiated over LTE network 120 between wireless communication device 101 and second communication interface 150 (204).

Figure 3:
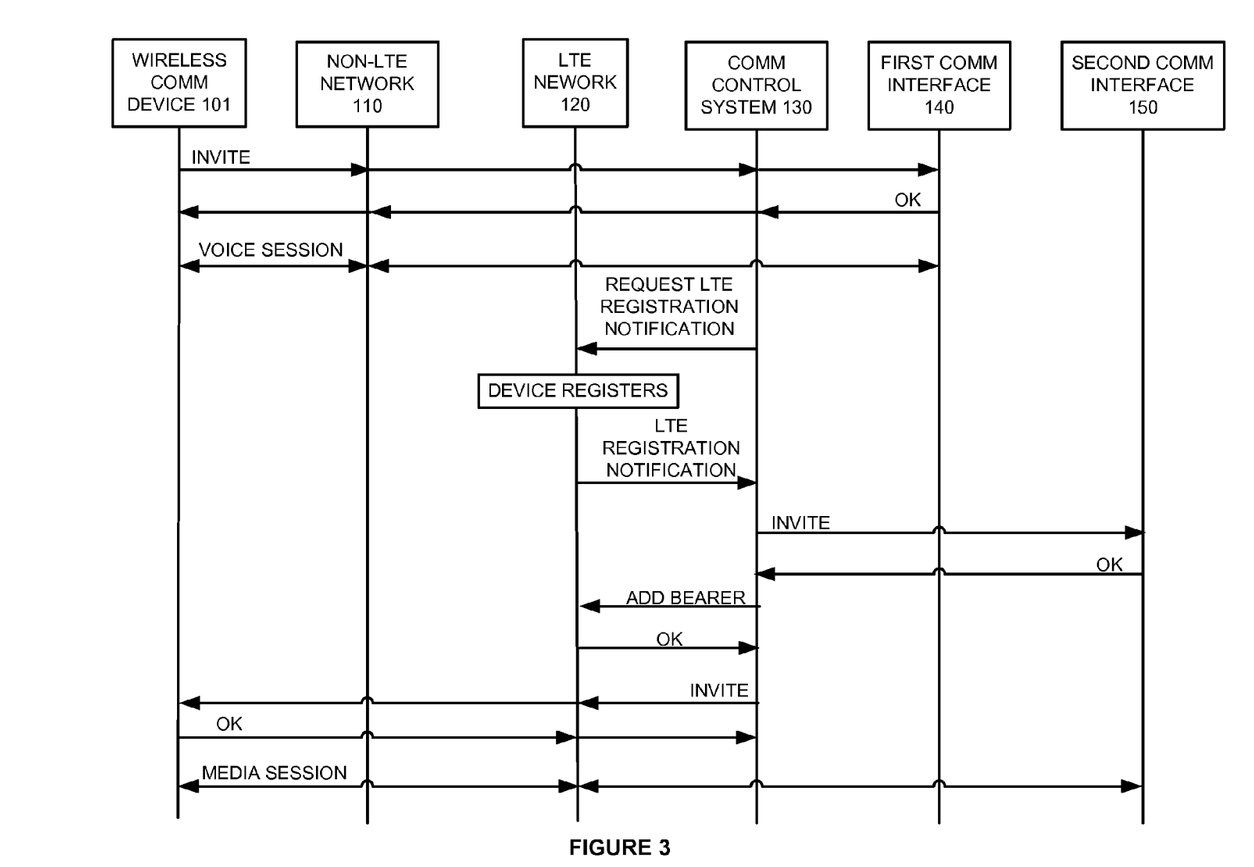
FIG. 3 illustrates the operation of the communication system to control communications over the LTE network and the non-LTE network.

FIG. 3 illustrates the operation of communication system 100 to control communications over LTE network 120 and a non-LTE network 110. Wireless communication device 101 transfers a communication session request over non-LTE network 110. The communication session request includes a Session Initiation Protocol (SIP) "INVITE" message transferred from wireless communication device 101 and a SIP "OK" message transferred from first communication interface 140.

In response, a voice communication session is initiated over non-LTE network 110 between wireless communication device 101 and first communication interface 140. Communication control system 130 requests an LTE registration notification when wireless communication device 101 registers with LTE network 120. Wireless communication device 101 registers with LTE network 120 and communication control system 130 receives the LTE registration notification. In response, a media communication session is initiated over LTE network 120 between wireless communication device 101 and second communication interface 150. Note that a signaling bearer is typically established upon LTE registration between wireless communication device 101 and communication control system 130.

Communication control system 130 transfers an "ADD BEARER" message to LTE network 120. LTE network 120 adds a new bearer and transfers a Diameter "OK" message. Communication control system 130 transfers a SIP "INVITE" message to LTE network. LTE network 120 transfers a SIP "INVITE" message to wireless communication device 101. In response, wireless communication device 101 transfers a SIP "OK" message to LTE network 120. LTE network 120 transfers the SIP "OK" message to communication control system 130. A media communication session is established between wireless communication device 101 and second communication interface 150. In some examples, other signaling protocols may be used.

Figure 4:
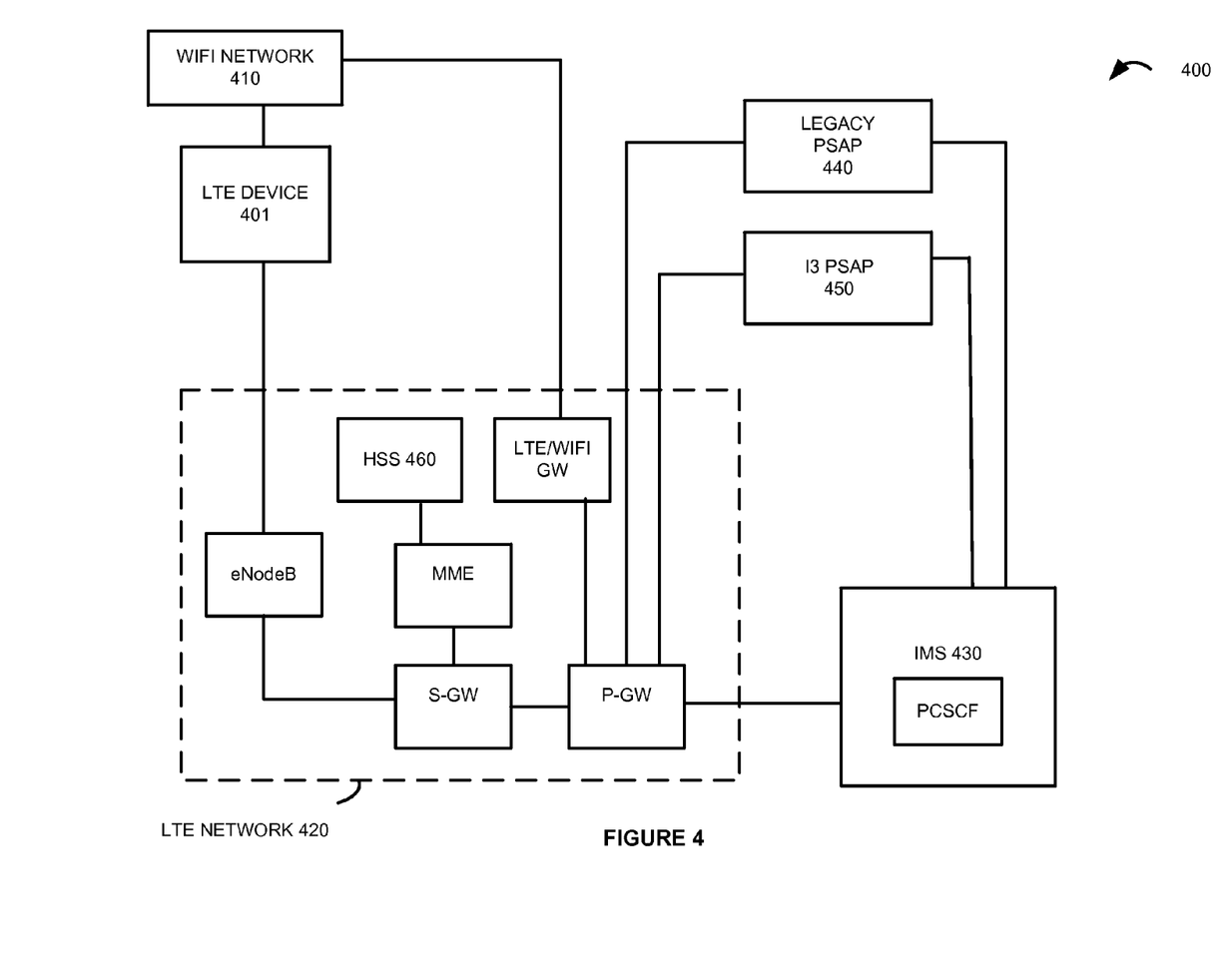
FIG. 4 illustrates a communication system to control communications over an LTE network and a WIFI network.

FIG. 4 illustrates communication system 400 to control communications over LTE network 420 and WIFI network 410. Communication system 400 is an example of communication system 100, although communication system 100 may use alternative configurations and operations. Communication system 400 comprises LTE device 401, WIFI network 410, LTE network 420, Internet Protocol (IP) Multimedia Subsystem (IMS) 430 Home Subscriber Server (HSS) 460, legacy PSAP 440, and i3 PSAP 450. LTE network 420 includes an eNodeB, Mobility Management Entity (MME), Serving Gateway (S-GW), PDN Gateway (P-GW), and an LTE/WIFI gateway. Legacy PSAP 440 and i3 PSAP 450 may be located in a single PSAP location or multiple PSAP locations.

IMS 430 receives a communication session request transferred by LTE device 401 over WIFI network 410, LTE/WIFI gateway, and LTE P-GW. The communication session request could comprise an emergency call request. In response, a voice communication session is initiated between LTE device 401 and legacy PSAP 440 over WIFI network 410, LTE/WIFI gateway, and LTE P-GW.

IMS 430 requests an LTE registration notification from HSS 460 in response to the emergency session. When LTE device 401 registers with LTE network 420, HSS 460 sends the LTE registration notification to IMS 430. In response, IMS 430 initiates a media communication session over LTE network 420 between LTE device 401 and i3 PSAP 450. In some examples, the media communication session includes an audio conference and a data link between LTE device 401 and i3 PSAP 450. The data link may be used to transmit images or other data. In other examples, the media communication session may include an audio conference and a video conference between LTE device 401 and i3 PSAP.

Figure 5:
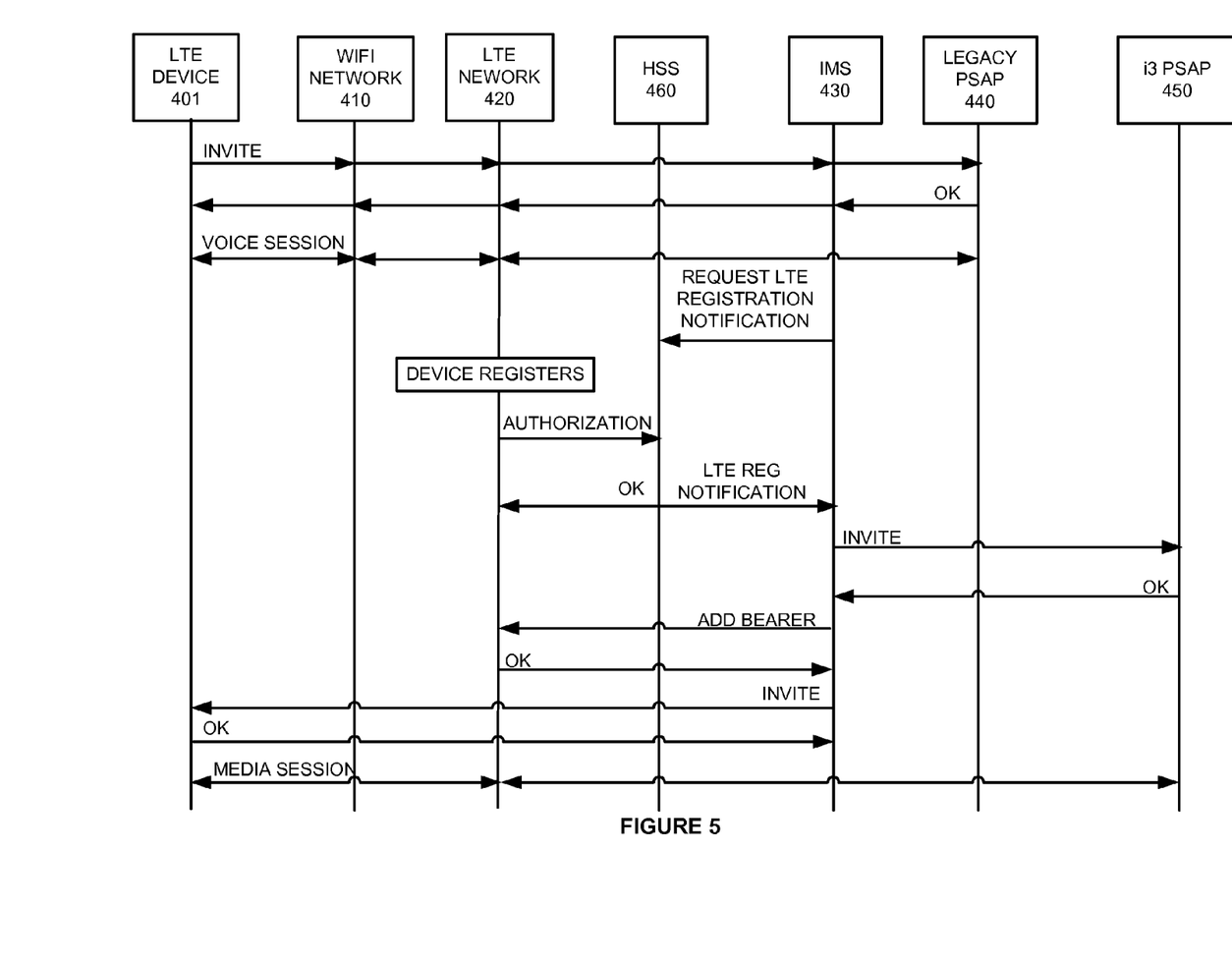
FIG. 5 illustrates the operation WIFI network.

FIG. 5 illustrates the operation of communication system 400 to control communications over LTE network 420 and WIFI network 410. LTE device 401 transfers a SIP "INVITE" message to WIFI network 410. WIFI network 410 transfers the SIP "INVITE" message to LTE network 420 via the LTE/WIFI gateway. LTE network 420 transfers the SIP "INVITE" message to IMS 430.

IMS 430 transfers a SIP "INVITE" message for delivery to legacy PSAP 440. Legacy PSAP 440 responds to IMS 430 with a SIP "OK" message. IMS 430 transfers a SIP "OK" message to LTE network 420. LTE network 420 transfers a SIP "OK" message to WIFI network 410. WIFI network 410 transfers a SIP "OK" message to LTE device 401. A voice communication session is then implemented between LTE device 401 and legacy PSAP 440 over WIFI network 410 and LTE network 420.

IMS 430 transfers a request for LTE registration notification to HSS 460 in response to the emergency session. In other examples, IMS 430 may request the LTE registration notification based on various factors such as call type, user Quality of Service (QoS), user selection, session endpoints, device type, or some other factors—including combinations thereof.

LTE device 401 registers with LTE network 420. In response, LTE network 420 transfers a request for authorization to HSS 460. The request for authorization may include authentication, accounting, and other processes associated with registering with a communication network. HSS 460 authorizes LTE device 401 and transfers notification to LTE network 420. HSS 460 also transfers an LTE registration notification to IMS 430. In response to the LTE registration, LTE network 420 establishes a signaling bearer between LTE device 401 and IMS 430.

In response, IMS 430 transfers a SIP "INVITE" message to i3 PSAP 450. i3 PSAP 450 responds with a SIP "OK" message to IMS 430. IMS 430 transfers an "ADD BEARER" message to LTE network 420. LTE network 420 adds a bearer and responds with an "OK" message back to IMS 430. IMS 430 transfers a SIP "INVITE" message to LTE device 401 over the signaling bearer. LTE device 401 responds with a SIP "OK" message to IMS 430. A media communication session is initiated between LTE device 401 and i3 PSAP 450 over LTE network 420, but not WIFI network 410.

Figure 6:
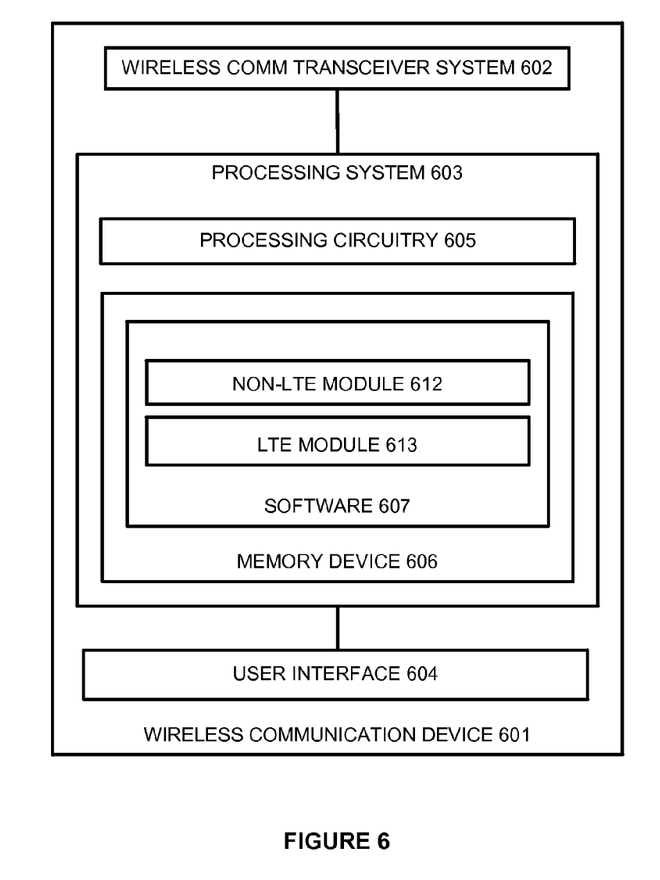
FIG. 6 illustrates a wireless communication device.

FIG. 6 illustrates wireless communication device 601. Wireless communication device 601 is an example of wireless communication device 101 and LTE device 401, although wireless communication device 101 and LTE device 401 could use alternative configurations. Wireless communication device 601 comprises wireless communication transceiver system 602, processing system 603, and user interface 604. Processing system 603 is linked to wireless communication transceiver system 602 and user interface 604. Processing system 603 includes processing circuitry 605 and memory device 606 that stores operating software 607. Software 607 comprises non-LTE module 612 and LTE module 613.

Wireless communication device 601 may include other well-known components such as a battery and enclosure that are not shown for clarity. Wireless communication device 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606, portions of wireless communication transceiver system 602, and user interface 604. Operating software 607 comprises computer programs, firmware, or some other form of machine-readable processing instructions. Operating software 607 may include an operating system, utilities, drivers, network interfaces, applications, or some other type of software. When executed by processing circuitry 605, operating software 607 directs processing system 603 to operate wireless communication device 601 as described herein.

When executed, software 607 directs processing system 603 to operate as described herein to control communications over a LTE network and a non-LTE network. In particular, non-LTE module 612 directs processing system 603 to process the communication session request to initiate a voice communication session over the non-LTE network. LTE module 613 directs processing system 603 to initiate a media communication session over the LTE network.

Figure 7:
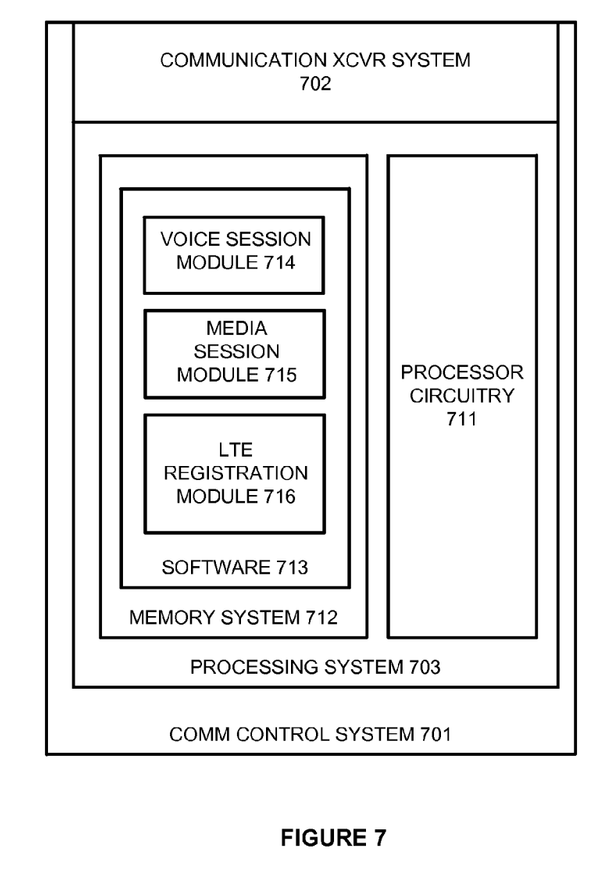
FIG. 7 illustrates a communication control system.

FIG. 7 illustrates communication control system 701. Communication control system 701 is an example of communication control system 130 and IMS 430, although these systems may use alternative configurations and operations. Communication control system 701 comprises communication transceiver system 702 and processing system 703. Processing system 703 includes processing circuitry 711 and memory system 712 that stores software 713. Software 713 comprises software modules 714-716.

Communication transceiver system 702 comprises components that communicate over communication links such as network cards, ports, RF transceivers, processing circuitry and software, or some other communication components. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof. Communication transceiver system 702 receives communication session requests.

Processor circuitry 711 comprises microprocessor and other circuitry that retrieves and executes operating software 713 from memory system 712. Processor circuitry 711 may comprise a single device or could be distributed across multiple devices—including devices in different geographic areas. Processor circuitry 711 may be embedded in various types of equipment. Examples of processor circuitry 711 include central processing units, application specific processors, logic devices, and/or any type of computer processing devices—including combinations thereof. Processor circuitry 711 processes the communication session requests to initiate voice and media communication sessions.

Memory system 712 comprises a non-transitory computer readable storage medium readable by processing system 703 and capable of storing software 713, such as a disk drive, flash drive, data storage circuitry, or some other hardware memory apparatus—including combinations thereof. Memory system 712 can include volatile and non-volatile, removable and non-removable media implemented in any method or technology for storage of information, such as computer readable instructions, data structures, program modules, or other data—including combinations thereof. Memory system 712 may comprise a single device or could be distributed across multiple devices—including devices in different geographic areas. Memory system 712 may be embedded in various types of equipment. In some examples, a computer apparatus could comprise memory system 712 and software 713.

Software 713 comprises computer programs, firmware, or some other form of machine-readable processing instructions. Software 713 may include an operating system, utilities, drivers, network interfaces, applications, or some other type of software. In this example, software 713 comprises voice session module 714, media session module 715, and LTE registration module 716, although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to control communications over a LTE network and a non-LTE network. In particular, voice session module 714 directs processing system 703 to initiate a voice communication session over a non-LTE network. Media session module 715 directs processing system 703 to initiate a media communication session over a LTE network. LTE registration module directs processing system to request an LTE registration notification and to process the LTE registration notification for specific type of sessions, endpoints, devices, or other factors.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless access node 102, but system 103 could be integrated within the components of wireless access node 102. Communication control system 103 could be a mobile switching center, network gateway system, Internet access node, application server, service node, or some other communication system—including combinations thereof.

Communication network 103 comprises network elements that provide communications services to wireless device 101 through wireless access node 102. Communication network 103 may comprise switches, wireless access nodes, Internet routers, network gateways, application servers, computer systems, communication links, or some other type of communication equipment—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 113-114 use metal, glass, air, space, or some other material as the transport media. Communication links 113-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 113-114 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication control system to control communications over a Long-Term Evolution (LTE) network and a non-LTE network, the method comprising:
   receiving a communication session request transferred by a wireless communication device over the non-LTE network,
   in response to the communication session request, initiating a voice communication session between the wireless communication device and a first communication interface;
   in response to the voice communication session over the non-LTE network with the first communication interface, requesting an LTE registration notification for the wireless communication device;
   receiving the LTE registration notification that the wireless communication device has registered with the LTE network,
   in response to the LTE registration and while the voice communication session over the non-LTE network is maintained, initiating an audio conference over the LTE network between the wireless communication device and a second communication interface; and
   in response to the LTE registration and while the voice communication session over the non-LTE network is maintained, initiating a data link over the LTE network between the wireless communication device and the second communication interface.

2. The method of claim 1 wherein the communication control system comprises an Internet Protocol (IP) Multimedia Subsystem (IMS).

3. The method of claim 1 wherein requesting the LTE registration notification in response to the voice communication session over the non-LTE network with the first communication interface comprises determining that the wireless communication device is LTE-capable in response to receiving the communication session request over the non-LTE network and requesting the LTE registration notification in response to determining that the wireless communication device is LTE-capable.

4. The method of claim 1 wherein the data link is used to initiate a video conference between the wireless communication device and the second communication interface.

5. The method of claim 1 wherein the non-LTE network comprises a Wireless Fidelity (WIFI) network.

6. The method of claim 1 wherein the non-LTE network comprises an Evolution Data Optimized (EVDO) network.

7. The method of claim 1 wherein the non-LTE network comprises a High Speed Packet Access (HSPA) network.

8. The method of claim 1 wherein the communication session request comprises an emergency request and wherein requesting the LTE registration notification in response to the voice communication session over the non-LTE network with the first communication interface comprises requesting the LTE registration notification in response to receiving the emergency request over the non-LTE network.

9. The method of claim 1 wherein the second communication interface comprises an i3 Public Safety Answering Point (PSAP).

10. A communication control system comprising
a communication interface configured to receive a communication session request transferred by a wireless communication device over a non-LTE network;
the communication interface configured to, in response to the communication session request, initiate a voice communication session over the non-LTE network between the wireless communication device and a first communication interface;
a processing system configured to, in response to the voice communication session over the non-LTE network with the first communication interface, request an LTE registration notification for the wireless communication device; and
the communication interface configured to receive the LTE registration notification that the wireless communication device has registered with a LTE network; and
the communication interface configured to, in response to the LTE registration and while the voice communication session over the non-LTE network is maintained, initiate an audio conference and a data link over the LTE network between the wireless communication device and a second communication interface.

11. The communication system of claim 10 wherein the communication control system comprises an Internet Protocol (IP) Multimedia Subsystem (IMS).

12. The communication system of claim 10 wherein the processing system is configured to determine that the wireless communication device is LTE-capable, and in response to request the LTE registration notification.

13. The communication system of claim 10 wherein the communication interface is configured to initiate a video conference between the wireless communication device and the second communication interface over the data link.

14. The communication system of claim 10 wherein the non-LTE network comprises a Wireless Fidelity (WIFI) network.

15. The communication system of claim 10 wherein the non-LTE network comprises an Evolution Data Optimized (EVDO) network.

16. The communication system of claim 10 wherein the non-LTE network comprises a High Speed Packet Access (HSPA) network.

17. The communication system of claim 10 wherein the communication session request comprises an emergency request and wherein the communication interface is configured to request the LTE registration notification in response to receiving the emergency request over the non-LTE network.

18. The communication system of claim 10 wherein the second communication interface comprises an i3 Public Safety Answering Point (PSAP).

\* \* \* \* \*